(12) United States Patent
Schnick et al.

(10) Patent No.: US 11,524,356 B2
(45) Date of Patent: Dec. 13, 2022

(54) ELECTRODE FOR A WELDING TORCH OR A CUTTING TORCH

(71) Applicant: KJELLBERG-STIFTUNG, Finsterwalde (DE)

(72) Inventors: Michael Schnick, Oberlungwitz (DE); Michael Dreher, Dresden (DE); Henning Schuster, Dresden (DE)

(73) Assignee: KJELLBERG-STIFTUNG, Finsterwalde (DE)

( * ) Notice: Subject to any disclaimer, the term of this patent is extended or adjusted under 35 U.S.C. 154(b) by 226 days.

(21) Appl. No.: 16/639,868

(22) PCT Filed: Aug. 17, 2018

(86) PCT No.: PCT/EP2018/072327
§ 371 (c)(1),
(2) Date: Feb. 18, 2020

(87) PCT Pub. No.: WO2019/034776
PCT Pub. Date: Feb. 21, 2019

(65) Prior Publication Data
US 2020/0361018 A1    Nov. 19, 2020

(30) Foreign Application Priority Data
Aug. 18, 2017 (DE) ...................... 10 2017 214 460.2

(51) Int. Cl.
*B23K 9/28* (2006.01)
*B23K 9/167* (2006.01)
*B23K 35/02* (2006.01)

(52) U.S. Cl.
CPC .............. *B23K 9/285* (2013.01); *B23K 9/167* (2013.01); *B23K 35/0205* (2013.01)

(58) Field of Classification Search
CPC .... B23K 9/167; B23K 9/285; B23K 35/0205; B23K 9/282; B23K 35/02
See application file for complete search history.

(56) References Cited

U.S. PATENT DOCUMENTS 5,349,153 A * 9/1994 Prucher .............. B23K 11/3009
219/117.1
6,268,583 B1 7/2001 Yamaguchi
(Continued)

FOREIGN PATENT DOCUMENTS

DE        102015001455        1/2016

OTHER PUBLICATIONS

Translation of Seiwart, DE 10 2015 001 455—WO 2016/008572 Jan. 21, 2016 (Year: 2016).*
International Search Report.

*Primary Examiner* — Brian W Jennison
(74) *Attorney, Agent, or Firm* — Jacobson Holman PLLC

(57) ABSTRACT

The invention relates to an electrode (16) for a welding torch (17) or a cutting torch, comprising a main body (1) and a tip (3) arranged on an end surface (2) of the main body (1). The main body (1) is designed as a hollow body that is open on at least one side. On a side opposite one of the tips (3), the main body has an opening (4) for introducing a cooling medium into an interior space (7) of the main body (1), and at least two regions (5, 6) in the interior space (7), the two inner diameters of which are different from one another, and a transition region (8) located between the two regions (5, 6) having an inner diameter that decreases in the direction of the tip (3).

13 Claims, 3 Drawing Sheets

(56) References Cited

U.S. PATENT DOCUMENTS

| | | | | |
|---|---|---|---|---|
| 6,628,583 B1* | 9/2003 | Van Den Enden | .... | G11B 20/10 369/47.1 |
| 7,265,313 B2* | 9/2007 | Stevenson | .......... | B23K 11/3054 219/119 |

* cited by examiner

ELECTRODE FOR A WELDING TORCH OR A CUTTING TORCH

BACKGROUND OF THE INVENTION

The present invention relates to an electrode for a welding torch or a cutting torch, to a welding torch or a cutting torch having an electrode of said type, and to a method in which the electrode is used.

In arc welding methods, a workpiece is at least partially melted by means of an arc. It is typically the case here that the workpiece serves as anode and a tungsten electrode of a welding torch serves as cathode.

Document DE 10 2015 001 456 A1 has disclosed a method in which the tungsten electrode forms the anode and the workpiece forms the cathode, whereby an oxide layer situated on the workpiece can be dissolved. However, the thermal loading of the tungsten electrode is in this case considerably higher than in the case of use as a cathode, and this necessitates improved cooling.

SUMMARY OF THE INVENTION

It is therefore the object of the present invention to propose an electrode for a welding torch or a cutting torch, which electrode avoids the stated disadvantages, that is to say exhibits improved cooling.

Said object is achieved according to the invention and advantageous embodiments and refinements are described in the claims.

An electrode for a welding torch or a cutting torch has a main body and a tip arranged on a terminating surface of the main body. The main body is formed as a hollow body which is open at least on one side, and, at a side situated opposite the tip, has an opening for the introduction of a cooling medium into an interior space of the main body. Furthermore, the main body has at least two regions in the interior space with two mutually different internal diameters. Furthermore, a transition region which is situated between the two regions is formed in the interior space of the main body, which transition region has an internal diameter which decreases in the direction of the tip.

By means of the design as a hollow body which is open on one side, a cooling medium, typically water, or else some other fluid, can be introduced into the cooling body through the opening. By means of the design of the interior space with at least three regions, wherein a diameter narrows starting from the diameter of the opening in the direction of the terminating surface and the tip, an expedient flow geometry is created in which the flow of cooling medium is incident at an adequately high speed and can correspondingly dissipate heat. Thermal loading of the electrode is thus considerably reduced.

The tip is typically formed from a material which differs from a material of the main body, though it is also possible for a similar or identical material to be used for the main body and the tip. In general, however, at least two different materials should be used, even if these are present in an alloy or as a matrix material or composite material.

The main body itself may be formed from copper or from some other metal in order to utilize the correspondingly high thermal and electrical conductivity of this material. The main body is preferably composed of Cu—HCP, that is to say a deoxidized copper with low residual phosphorus content, or of sulfur-containing copper Cu—S with improved cuttability.

The tip is preferably formed from tungsten, but may also be formed from tungsten with a doping in order to increase an emission of electrons at an anode, for example with a doping of lanthanum oxide or of cerium oxide. Provision may also be made for a doping to be provided for reducing an oxygen affinity in the tip composed of tungsten. Such dopings typically have yttrium or zirconium.

The main body and the tip may however also be formed as a single part or as a single piece composed of mixed copper and tungsten, possibly with the described additives.

The main body and the tip are typically formed as a single part in order to ensure a mechanically stable construction.

Provision may be made whereby the main body is equipped with a thread on an outer surface or side surface surrounding the opening, wherein a diameter of the thread is preferably larger than a diameter of the terminating surface. This makes it possible for the main body to be more easily screwed into the welding torch or the cutting torch and assists the improved flow guidance of the cooling medium. The diameter of the thread may be larger by at least 15 percent, preferably by at least 30 percent to 70 percent, particularly preferably by at least 40 percent to 60 percent, than the diameter of the terminating surface. The thread may, for example for an improved transfer of current, be designed as a fine thread in accordance with DIN 13-21.

The two regions of the interior space with mutually different internal diameters are typically provided with a circular cross section, that is to say have a cylindrical volume. Provision may however also be made for the cross section to be polygonal, for example hexagonal or octagonal. A diameter can be defined in this case, too, which can however also be understood as a width.

The main body may have, in its interior space opposite the opening, an end surface, which is preferably designed as a planar end surface and which is typically oriented parallel to the terminating surface. By means of a closed planar or flat end surface, that is to say a surface without significant elevations or depressions, a dissipation of heat through formation of a desired incident flow is facilitated. The main body is then thus formed as a hollow body which is open on one side. Alternatively, the end surface may also have an elevation, which is typically arranged centrally. The elevation may for example be of conical or cylindrical form.

Provision may however also be made for the main body to be designed as a hollow body which is open on both sides, and for the tip to be arranged at an opening of the terminating surface, which is now no longer present as a closed surface. Typically, in this case, the tip also projects into the interior space of the electrode in order to assist a dissipation of heat.

At the end surface, the main body may have, in its interior space, at least a corner radius of at least 0.5 mm, by means of which a formation of a dead water region is prevented, and thus a continuous flow is assisted.

Provision may be made whereby a web, which is situated between the terminating surface and the end surface, of the main body has a thickness which corresponds to at most 40% of an original height of the tip. The expression "original height" is to be understood here to mean a height in the delivery state, which may decrease during operation. In this case, the terminating surface and the end surface are each in the form of closed surfaces. Here, it is the intention for the height of the tip to be defined as a spacing between a point on a side of the tip averted from the terminating surface, which point has a maximum spacing to the terminating surface, and a point of the tip which, as a perpendicular projection of the first point on the terminating surface, is in direct physical contact with the terminating surface.

Typically, said original height, that is to say the height before a welding process is performed, amounts to between 1.2 mm and 5 mm. Such a geometry ensures firstly adequate mechanical stability and secondly a sufficient dissipation of heat.

Alternatively or in addition, the tip may have an edge-free and/or stepless convex surface at its surface averted from the main body. This permits a more uniform formation of an arc owing to a continuous surface profile.

The main body may have at least one centering surface on its outer side, by means of which centering surface an installation into the welding torch or the cutting torch is facilitated. Typically, preferably in a manner corresponding to the two regions of different internal diameter in the interior space, it is also the case on the outer side that a first outer region is provided which has a smaller outer diameter than a second outer region, which accordingly has a relatively large outer diameter. Between said first outer region and the second outer region, there may be provided an outer transition region in which the outer diameter increases toward the second outer region. The centering surface is typically formed as a termination of the outer transition region.

Preferably, both the internal diameter in the inner transition region and the external diameter in the outer transition region vary in continuous fashion, that is to say without abrupt changes, steps or edges.

The main body may, at its outer side, have a depression into which a sealing ring is typically inserted. The sealing ring may be formed from an elastic material, in particular from a plastic, preferably polytetrafluoroethylene, or a metal. Alternatively or in addition, the sealing ring may also be formed from polytetrafluoroethylene, or a metallic material. By means of the depression with the sealing ring, a fluid-tight seal can be realized after the installation into the welding torch or the cutting torch.

The tip may be fastened to the connection surface by means of a soldered connection or a welded connection, in order to ensure a secure holding action.

A welding torch or a cutting torch typically has an electrode with the described characteristics, which functions as anode. The electrode may however self-evidently also be used as a cathode in the welding torch or the cutting torch. Likewise, the welding torch or the cutting torch may also be operated with an electrical alternating current.

The welding torch or the cutting torch may be formed as a tungsten inert gas welding torch or tungsten inert gas cutting torch. In the context of this document, an inert gas is to be understood primarily as argon and helium and mixtures of these two gases. Furthermore, however, mixtures of the stated gases with active gases such as oxygen, hydrogen and/or carbon dioxide are also to be understood as inert gas. The active gases are in this case typically present in concentrations of less than 5 percent by mass in the inert gas.

In a method for welding, preferably for tungsten inert gas welding, a welding torch or a cutting torch with the described characteristics, that is to say in particular with an electrode with the above-described characteristics as an anode and a workpiece as a cathode, by application of an electrical welding current to the anode and the cathode, an arc can be formed between the tip of the electrode and a machining region of the workpiece.

In the method, in addition to a shielding gas, which is typically used in tungsten inert gas welding, a focusing gas may be conducted onto the machining region of the workpiece. For this purpose, the welding torch or the cutting torch typically has two different gas feed channels, wherein the gas feed channel for the focusing gas is preferably arranged between the electrode and the gas feed channel for the shielding gas.

DESCRIPTION OF THE DRAWINGS

Exemplary embodiments of the invention are illustrated in the drawings and will be discussed below on the basis of FIGS. 1 to 5.

In the drawings.

DETAILED DESCRIPTION OF THE INVENTION

Figure 1:
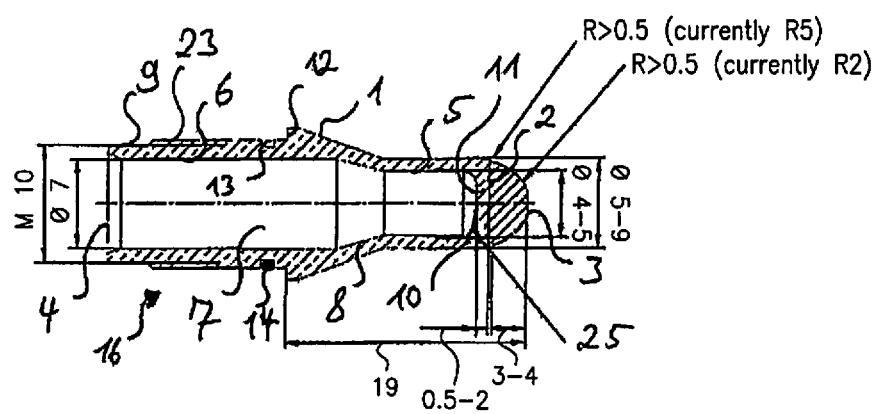
FIG. 1 shows a sectional view of an electrode.

FIG. 1 shows an electrode 16 in a sectional illustration. The electrode 16 has a main body 1 composed of copper, which is designed as a hollow body which is open on one side, that is to say is formed as a hollow electrode. A cooling medium such as water can be introduced into an interior space 7 of the main body 1 through an opening 4. In the exemplary embodiment illustrated, the opening 4 is circular and has a diameter of 7 mm. In further exemplary embodiments, use may however also be made of some other shape of the opening 4 and/or some other diameter. The dimensional specifications given in FIG. 1 are likewise to be regarded merely as examples, and may self-evidently also assume different values in further exemplary embodiments.

A tip 3 composed of tungsten is applied to a terminating surface 2 or face surface which is situated opposite the opening 4 along a longitudinal axis of the main body 1, said tip being fastened to said terminating surface 2 by means of a soldered connection. In the exemplary embodiment illustrated in FIG. 1, the terminating surface 2 and a base surface of the tip 3 lie one over the other in an aligned manner, are each circular, and have a diameter of 5 mm. In further exemplary embodiments, the diameter may however also amount to up to 9 mm. The terminating surface 2 is furthermore arranged at an angle of 90° with respect to the surrounding outer surface of the main body 1. Provision may also be made for the transition between the main body 1 and the tip 3 to be provided with a radius of 5 mm. Said radius should be at least greater than 0.5 mm. The terminating surface 2 is thus oriented in the direction of a workpiece for machining, which can also be referred to as being at the arc side.

The tip 3 has an original height of 3 mm to 5 mm in the exemplary embodiment shown. A web 11 of the main body 1, which web runs between the terminating surface 2 on the outer side of the main body 1 and an end surface 10, which corresponds thereto and runs parallel to the terminating surface 2, on an inner side of the main body 1, is typically between 0.5 mm and 2 mm in thickness.

The tip 3, in its original state, that is to say before a welding process is carried out or in the delivery state, has a typically edge-free surface, which is flattened at its front end averted from the main body 1 and which thus runs parallel to the terminating surface 2 in said region. Said end may likewise be provided with a radius as a transition to the rest of the surface of the tip 3. In the exemplary embodiment illustrated, the radius amounts to 2 mm, but should be greater than 0.5 mm. Owing to the tip 3 of such domed form, or a tip 3 with a free-form surface with similar curvature parameters, it is possible to realize arc characteristics which are temporally as constant as possible.

In the interior space 7 of the main body 1, a first region 5 in the interior space 7 is provided which has an internal diameter of 4-5 mm, a second region 6 of the interior space 7 which has an internal diameter of 7 mm, that is to say an internal diameter which corresponds exactly to the diameter of the opening 4 adjoining the second region 6, and an inner transition region 8, in which the internal diameter increases conically starting from the first region 5 to the internal diameter of the second region 6. In the transition region 8, the gradient amounts to between 5' and 30°, preferably between 10° and 20°. By means of this internal diameter, a high flow speed at an electrode tip is realized, and thus a dissipation of heat is assisted, whereas, at an electrode shank, at which the opening 4 is also arranged, a lower flow speed is generated, which exhibits a lower flow resistance and a lower pressure drop.

The outer side of the main body 1 is similarly divided into three regions. In a first, outer region, an outer diameter corresponds in the exemplary embodiment shown to the diameter of the tip 3, but in a second region corresponds to a diameter of a metric thread 23 arranged on a side surface surrounding the opening 4, which thread is designed with an external diameter M 10×0.75 and is configured in accordance with DIN 13-21 to -23. Additionally, an insertion aid 9 may be provided, in the case of which a free space with a length of 1 mm to 5 mm is provided between an end of the main body 1, which end is averted from the tip 3, and the thread 23.

An enlargement of the outer diameter occurs in turn in an outer transition region. A gradient in said region may amount to between 5' and 30°, preferably between 10° and 20°. As illustrated in FIG. 1, it is possible both in the inner transition region and in the outer transition region for the internal diameter and the outer diameter to be varied in continuous fashion, that is to say without steps. The outer diameter of the thread 23 is typically at least 15 percent greater than the diameter of the terminating surface 2.

Furthermore, adjoining the outer transition region on the outer side of the main body 1, there is provided a centering surface 12 which faces toward the second, outer region, that is to say also the opening 4, which centering surface likewise serves for simplified fastening of the electrode 16. Accordingly, a welding torch may have a corresponding counterpart surface with respect to the centering surface 12 in the electrode holder, which counterpart surface forms a clearance fit H7g7 or H7f7. Adjoining the centering surface 12 in the direction of the opening 4, the main body 1 is furthermore equipped, on its outer side, with a depression 13, into which a sealing ring 14 composed of an elastic plastic is inserted. A spacing between the centering surface 12 and an end of the tip 3 amounts to 19 mm in the exemplary embodiment illustrated. The sealing ring 14 may, depending on the embodiment, be arranged either to the left or to the right of the centering surface 12, that is to say either between the centering surface 12 and the opening 4, or between the centering surface 12 and the tip 3.

In order to ensure an optimized flow profile of the cooling medium in the interior space 7 of the main body 1, the end surface 10 is provided with a corner radius 25 of 1 mm, which in further exemplary embodiments may however also lie between 0.25 mm and 2 mm, preferably between 0.5 mm and 1.5 mm. The end surface 10 may also be formed so as to taper to a point with an opening angle of between 150° and 210° of the two limbs, wherein, in the exemplary embodiment illustrated in FIG. 1, specifically an opening angle of 180° is realized.

For efficient cooling, a ratio of a length of the first region 5 to the inner diameter in said region may amount to between 0.5 and 1.5.

The above-described electrode 16 is typically used in a welding torch as an anode. It is thus possible to perform tungsten inert gas welding, and the welding torch is thus in this case a tungsten inert gas welding torch. In further exemplary embodiments, instead of a welding torch, it is also possible for a cutting torch to be used and equipped with the electrode described above and below.

To attach the tip 3 to the main body 1, use may generally be made of soldering methods or welding methods, which restrict the temperature required for the joining process to an immediate joining zone of the workpiece, that is to say of the main body 1, and work-hardened material characteristics (in particular a relatively high strength) in the remaining part of the electrode 16 are thus maintained, which is important in particular for cutting machining. Possible methods are therefore friction welding, for example rotary friction welding, inertia friction welding, direct-drive friction welding, percussion welding, for example capacitor discharge welding, ultrasound welding, explosion welding, diffusion welding and/or resistance welding. As soldering methods, use may be made of autogenous soldering, induction soldering, shielding-gas soldering, vacuum soldering, laser soldering and/or infrared soldering. Alternatively or in addition, as solders, use may be made of special silver-containing hard solders with wetting-promoting agents for hard metal such as manganese or nickel and/or sandwich solders with copper additives for reducing thermal stresses.

Figure 2:
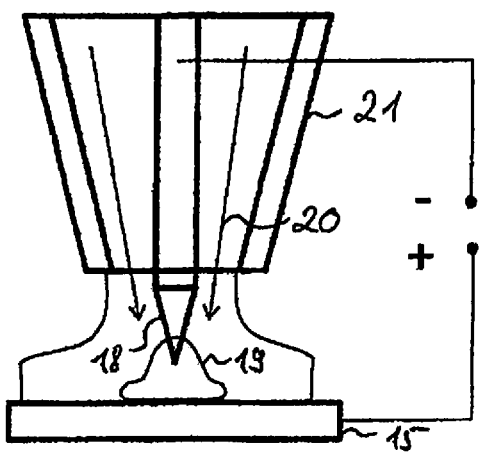
FIG. 2 shows a schematic view of a tungsten inert gas welding method known from the prior art.

FIG. 2 shows, in a schematic lateral view, a conventional tungsten inert gas welding method known from the prior art. A welding torch 21 has an electrode 18 which forms an arc 19 and which thus machines a workpiece 15. The electrode 18 functions as cathode, and a shielding gas 20 is conducted onto a surface, which is to be machined, of the workpiece 15. Repeated features are denoted in this figure and in the following figure by identical reference designations.

Figure 3:
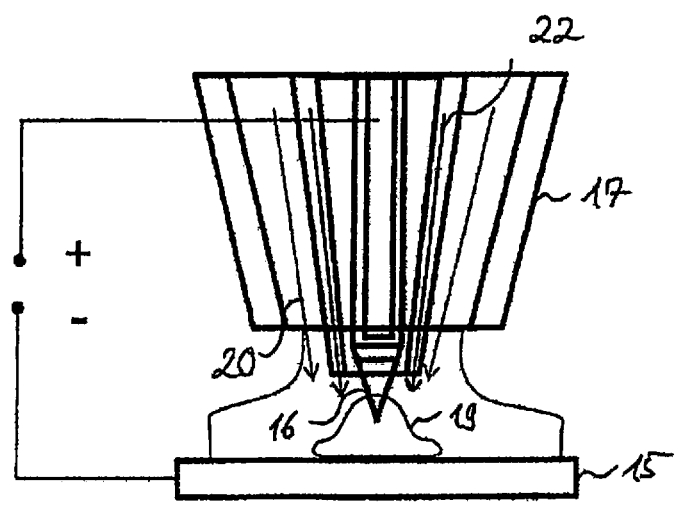
FIG. 3 shows a view, corresponding to FIG. 2, of a tungsten inert gas welding method using the electrode.

FIG. 3 illustrates, in a view corresponding to FIG. 2, a high-performance positive-pole tungsten inert gas welding method. A welding torch 17 now has the electrode 16 with the above-described characteristics, which is mounted centrally in the welding torch 17 but which now serves as anode. By application of an electrical welding current between the electrode 16 and the workpiece 15, the arc 19 forms on a machining region of the workpiece 15. In addition to the shielding gas 20, which is typically an inert gas such as helium or argon, a focusing gas 22, for example an inert gas with 100-1000 ppm oxygen, preferably argon with 300 ppm oxygen, is conducted through the welding torch 17 onto the machining region of the workpiece 15.

Figure 4:
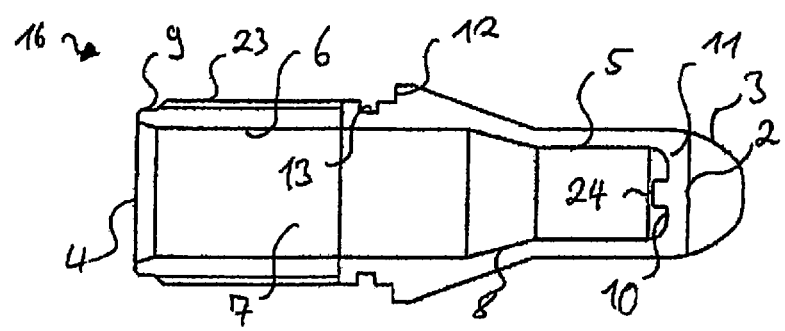
FIG. 4 shows an illustration, corresponding to FIG. 1, with a geometrically modified end surface.

FIG. 4 in turn shows, in an illustration corresponding to FIG. 1, a cross section of the electrode 16, in which the end surface 10 is however not planar but rather has a centrally arranged elevation 24. In the exemplary embodiment illustrated, a height of the elevation 24 is smaller than a spacing of a side surface of the elevation 24 to a wall, surrounding the elevation 24, of the interior space 7. The elevation 24 is formed as a single piece with the main body 1 in a cohesive connection and serves for improved transport of heat from the tip 3 into the interior space 7, such that heat that is generated can also be more easily dissipated in the interior space 7.

Figure 5:
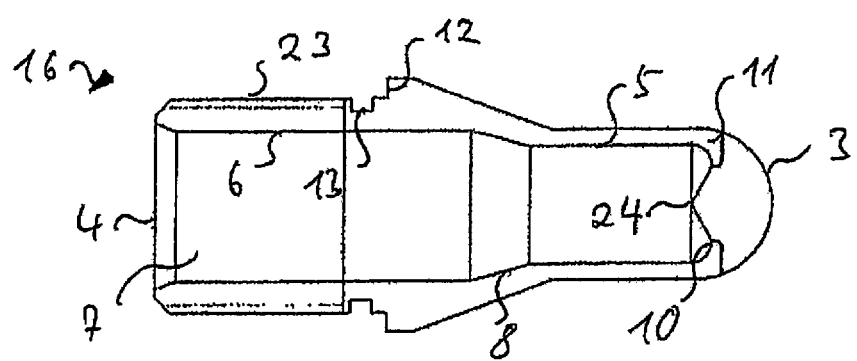
FIG. 5 shows an illustration, corresponding to FIG. 1, with a tip projecting into the interior space.

Correspondingly, FIG. 5 shows an exemplary embodiment in which the terminating surface 2 is not closed but rather has an opening into which the tip 3 is inserted. The main body is thus a hollow body which is open on both sides, wherein the two openings are situated opposite one another. The tip 3 now likewise has a conical elevation 24 which points into the interior space 7 and by means of which improved heat transport is realized.

Features of the various embodiments disclosed only in the exemplary embodiments may be combined with one another and claimed individually.

The invention claimed is:

1. An electrode for a welding torch or a cutting torch, having
   a main body and
   a tip arranged on a terminating surface of the main body,
   wherein the main body is formed as a hollow body which is open at least on one side,
   at a side situated opposite the tip, has an opening for the introduction of a cooling medium into an interior space of the main body and
   at least two regions in the interior space with two mutually different internal diameters, and a transition region which is situated between the two regions and which has an internal diameter which decreases in the direction of the tip, wherein the main body is equipped with a thread on an outer surface surrounding the opening, wherein a diameter of the thread is larger by at least 15% than a diameter of the terminating surface to increase cooling by the cooling medium.

2. The electrode as claimed in claim 1, wherein the tip is formed from a material which differs from a material of the main body.

3. The electrode as claimed in claim 1, wherein the main body has, in its interior space opposite the opening, a preferably planar end surface which is oriented parallel to the terminating surface.

4. The electrode as claimed in claim 3, wherein the main body has, in its interior space at the end surface, at least a corner radius of at least 0.5 mm.

5. The electrode as claimed in in claim 3, wherein a web, which is situated between the terminating surface and the end surface, of the main body has a thickness which corresponds to at most 40 percent of an original height of the tip.

6. The electrode as claimed in claim 1, wherein the tip has an edge-free and/or stepless convex surface at its side averted from the main body.

7. The electrode as claimed in claim 1, wherein the main body has at least one centering surface on its outer side.

8. The electrode as claimed in claim 1, wherein the main body has a depression on its outer side, into which depression a sealing ring is inserted.

9. The electrode as claimed in claim 1, wherein the tip is fastened to the terminating surface by means of a soldered connection or a welded connection.

10. A welding torch or cutting torch having an electrode as claimed in claim 1, which electrode functions as an anode.

11. The welding torch or cutting torch as claimed in claim 10, wherein the welding or cutting torch is designed as a tungsten inert gas welding torch or as a tungsten inert gas cutting torch.

12. A method for welding by means of the welding torch or the cutting torch as claimed in claim 10 with the electrode as an anode and with a workpiece as a cathode, by applying an electrical welding current to the anode and the cathode and forming an arc between the tip of the electrode and a machining region of the workpiece.

13. The method as claimed in claim 12, wherein in addition to a shielding gas, a focusing gas is conducted onto the machining region of the workpiece through the welding torch or the cutting torch.

* * * * *